United States Patent [19]
Kushner

[11] 3,893,216
[45] July 8, 1975

[54] APPARATUS FOR EXTRACTING BEARINGS FROM A SUPPORTING STRUCTURE

[76] Inventor: Stephen R. Kushner, 3706 Vista View, Pittsburgh, Pa. 15122

[22] Filed: June 26, 1974

[21] Appl. No.: 483,257

Related U.S. Application Data

[63] Continuation-in-part of Ser. No. 400,124, Sept. 24, 1973, abandoned.

[52] U.S. Cl. .................................. 29/265; 29/258
[51] Int. Cl. ............................................. B25b 27/06
[58] Field of Search ...... 29/256, 258, 259, 262–265, 29/282

[56] References Cited
UNITED STATES PATENTS

| | | | |
|---|---|---|---|
| 736,991 | 8/1903 | Matthews | 29/265 |
| 915,325 | 3/1909 | Bartol | 29/262 UX |

*Primary Examiner*—Donald G. Kelly
*Assistant Examiner*—Harold P. Smith, Jr.
*Attorney, Agent, or Firm*—Stanley J. Price, Jr.

[57] ABSTRACT

Apparatus for extracting bearings from a supporting structure includes a cylindrical member having an axial bore therethrough with an intermediate threaded end portion and an expandable second end portion that is positioned in abutting relation with the bore wall of a bearing. The expandable end portion is provided with a plurality of longitudinal radially extending slots to form a plurality of jaws which frictionally engage the bearing bore wall. A rod member having a threaded end portion is axially positioned in the cylindrical member bore. A tapered sleeve member having an internally threaded bore arranged in threaded engagement with the rod member threaded end portion is positioned within the cylindrical member bore. Rotation of the rod member in the cylindrical member advances the sleeve member on the rod member axially within the cylindrical member bore to thereby urge the jaws into frictional engagement with the bearing bore wall. A fastening nut on the cylindrical member intermediate portion is urged into frictional engagement with the bearing surface of a brace member rigidly supported independently of the cylindrical member to maintain the jaws immovable relative to the bearing and move the bearing axially out of the supporting structure.

4 Claims, 5 Drawing Figures

APPARATUS FOR EXTRACTING BEARINGS FROM A SUPPORTING STRUCTURE

CROSS-REFERENCE TO RELATED APPLICATION

This application is a continuation-in-part of application, Ser. No. 400,124, filed on Sept. 24, 1973, now abandoned and entitled "Apparatus For Extracting Bearings From A Supporting Structure."

BACKGROUND OF THE INVENTION

1. Field of the Invention

This invention relates to apparatus for extracting bearings from a supporting structure and more particularly to a bearing extracting apparatus having a radially expandable end portion for frictionally engaging the bearing bore wall at a selected depth within the bearing bore.

2. Description of the Prior Art

The conventional bearing extractor for removing a bearing from its supporting structure includes an expandable sleeve member coaxially mounted on a threaded shaft. The threaded sleeve member is positioned within the bearing bore and advancement of the threaded member through the sleeve urges the wall end portion of the sleeve member into locking engagement with the innermost bearing wall. The threaded shaft abuts the seat or bottom of the bearing bore to provide a resistive force against the shaft as the bearing engaged by the sleeve member is removed from its supporting structure. However, problems are encountered with bearings having little or no clearance between the innermost bearing wall and the supporting structure to permit engagement of the flanged end portion of the sleeve member as in the case of coaxially mounted bearings. Furthermore, the requirement that a resistive force be applied to the end of the threaded shaft limits the use of this type of bearing extractor to bearings having a seat or a closed wall.

U.S. Pat. No. 1,710,835 discloses a screw rod having an end portion which abuts the closed wall of the bearing recess. Axial advancement of the screw rod within the bearing bore urges the surface of the beveled head of a sleeve member surrounding the screw rod to move into wedging engagement with the beveled end of the cylindrical casing surrounding the screw rod. With this arrangement the jaws of the sleeve expand into frictional engagement with the bearing. Further engagement of the screw rod having the jaws in engaging relation with the bearing forces the bearing outwardly from its supporting structure. For successful removal of the bearing, the tip of the screw rod must be positioned in abutting relation with the closed wall of the bearing recess. Without the screw rod positioned in abutting relation with the closed wall of the bearing recess, resistive force cannot be applied to the screw rod to permit extraction of the bearing from its supporting structure.

In U.S. Pat. 2,290,427 the free edge of an internally threaded collar mounted on an elongated screw is flared outwardly to engage behind the bearing structure having a complementary flared edge portion which coacts with flared edge of the collar. The elongated screw has a round end portion that is arranged to fit within a pocket provided within the supporting wall structure. As an external nut mounted on the elongated screw engages the collar, a wedge member is moved outwardly to expand a sleeve to thereby urge the flared end portion of the collar into engagement with the flared edge of the bearing bore wall. Consequently, use of the bearing puller is limited to bearings having a bore wall flared at one end and a supporting structure provided with a pocket therein.

U.S. Pat. Nos. 2,755,540 and 3,055,093 illustrate and describe apparatus for extracting sleeves, bushings, bearings and the like from a support housing. A locking device threadedly mounted on a sleeve member is positioned in abutting contact with the face of the support housing to support the sleeve member within the bearing bore and provide a resistive force exerted upon the support housing for extraction of the bearing therefrom. This feature restricts use of the extractor to situations where the face of the supporting structure is unobstructed and sufficient clearance is available to position the locking device in contact with the face.

In U.S. Pat. No. 2,755,540 a screw rod maintained axially within the cylindrical member advances therethrough to spread radially gripping fingers comprising the lower portion of the cylindrical member. The fingers have external teeth that penetrate and securely grip the bearing wall. However, extraction of the bearing from the support housing in this manner mutilates the bearing wall, making the bearing undesirable for future use.

There is a need to provide apparatus for extracting bearings and the like from a supporting structure wherein the expandable end portion is not required to be wedged behind the innermost wall of the bearing to facilitate extraction of the bearing therefrom. Furthermore, the extractor should be capable of removing the bearing from its supporting housing without need for the threaded member to abut the seat or bottom wall of the supporting structure.

SUMMARY OF THE INVENTION

In accordance with the present invention there is provided apparatus for extracting a bearing from a supporting structure that includes a cylindrical member having an axial bore therethrough and an externally threaded intermediate portion. The cylindrical member has a first end portion and a radially expandable second end portion positioned within the bore of the bearing to be extracted. A rod member is axially positioned within the cylindrical member bore and includes a tool receiving end portion and a threaded end portion. A tapered sleeve member is coaxially positioned within the cylindrical member bore and is threadedly engaged to the rod member threaded end portion. Rotation of the rod member advances the sleeve member axially into the cylindrical member bore and urges the cylindrical member second end portion into frictional engagement with the bearing. A threaded fastener engaged to the cylindrical member intermediate portion is advanced thereon into frictional contact with a bearing surface of a plate member rigidly supported independently of the cylindrical member intermediate portion in spaced relation to the supporting structure. The engagement of the threaded fastener to the plate member and further rotation of the threaded fastener axially moves the bearing engaged to the cylindrical member second end portion out of the supporting structure.

The cylindrical member radially second end portion is provided with a plurality of longitudinal slots that are equally spaced on the periphery of the second end portion. The longitudinal slots extend radially outwardly from the bore of the cylindrical member to form a plurality of wall engaging jaws. Rotation of the rod member in the cylindrical member bore axially advances the tapered sleeve on the rod member into the cylindrical member bore expanding the jaws outwardly into frictional engagement with the bearing bore wall. With this arrangement the jaws exert uniformly applied radial forces upon the bearing bore wall to permit extraction of the bearing from its supporting structure.

Accordingly, the principal object of this invention is to provide an apparatus for extracting a bearing from a supporting structure by frictionally engaging the bearing bore wall.

Another object of this invention is to provide a bearing extractor that is operable to remove singly a plurality of coaxially mounted bearings within a supporting structure.

A further object of this invention is to provide a bearing extractor having expandable wall engaging jaws that frictionally engage the bearing bore wall at a selected depth within the bearing bore.

These and other objects and advantages of this invention will be more completely disclosed and described in the following specification, the accompanying drawings and the appended claims.

DESCRIPTION OF THE PREFERRED EMBODIMENTS

Figure 1:
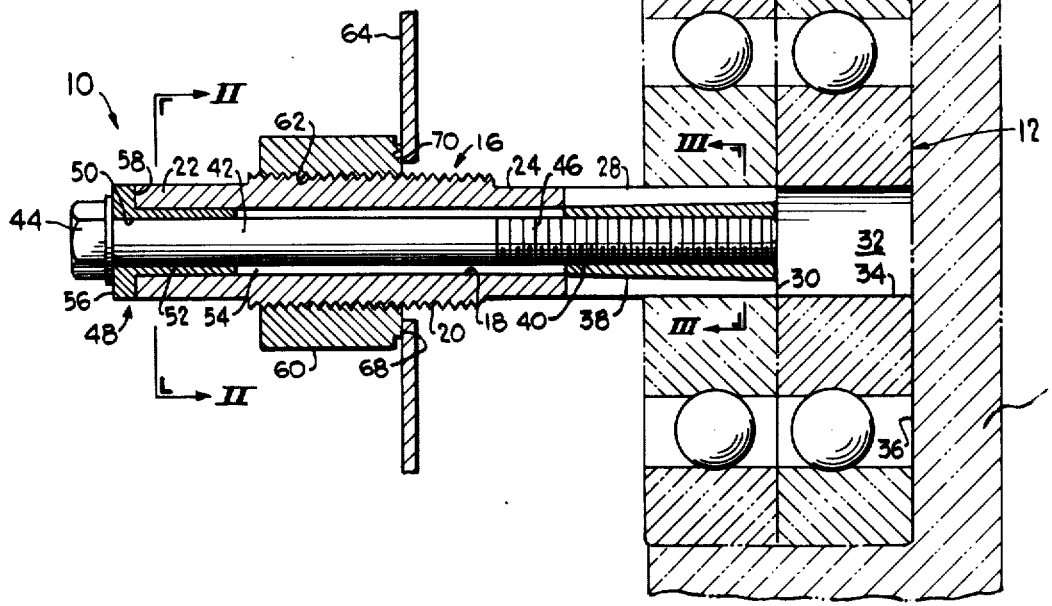
FIG. 1 is a longitudinal sectional view of the bearing extractor, illustrating the extractor in position for removing a bearing from its supporting structure.

Referring to the drawings and particularly FIG. 1, there is illustrated a bearing extractor generally designated by the numeral 10 for removing a bearing assembly 12 from its supporting structure 14. The bearing extractor 10 includes a cylindrical member generally designated by the numeral 16 having an axial bore 18 provided therethrough. An enlarged diameter externally threaded portion 20 is provided intermediate the end portions 22 and 24 of cylindrical member 16. The first and second end portions 22 and 24 each have a uniform outside diameter which is less than the diameter of the threaded intermediate portion 20.

Figure 3:
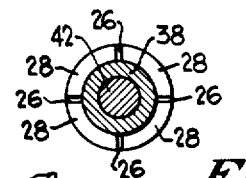
FIG. 3 is a sectional view of the bearing extractor taken along the line III–III of FIG. 1, illustrating the radial arrangement of the longitudinal slots provided in the end portion of the extractor.

The second end portion 24 is provided with a plurality of longitudinal slots 26 arranged on the periphery thereof and spaced at equal intervals around the end portion 24 as illustrated in FIG. 3. The longitudinal slots 26 extend radially outwardly from the axial bore to provide a plurality of wall engaging jaws 28. The jaws 28 are separated by the longitudinal slots 26 which progressively decrease in depth from a position adjacent the intermediate portion 20 to the extreme end 30 of the second end portion 24. With this arrangement the axial bore 18 within the second end portion 24 progressively increases in diameter from the ends of the slots 26 adjacent the intermediate portion 20 to the extreme end 30 of the second end portion 24 where the bore 18 reaches a maximum diameter.

The wall engaging jaws 28 are inserted to a selected depth within the bearing bore 32, preferably to a position where the extreme end 30 is aligned with the innermost wall of the bearing to be extracted, and arranged in abutting relationship with the bearing bore wall 34. As illustrated in FIG. 1, a pair of bearing assemblies 12 are coaxially mounted within the recess 36 of the supporting structure 14. The bearing extractor 10 is positioned within the bearing bore 32 to permit individual extraction of each of the bearing assemblies 12. By extending the extreme end 30 of the cylindrical member 16 within the bearing bore 32 to the maximum depth of the outermost bearing assembly 12 mounted in the recess 36, the outermost bearing assembly 12 may be extracted from the supporting structure 14, leaving the second or innermost bearing assembly 12 retained in the recess 36. The practice of this invention is not limited to removal of pairs of bearings from a supporting structure but is also adapted for the individual extraction of any number of bearings coaxially mounted within a supporting structure.

A tapered sleeve member 38 having an internally threaded bore 40 engaged to the end of a rod member 42 is coaxially positioned within the cylindrical member axial bore 18 at the second end portion 24. The external diameter of the tapered sleeve member 38 varies uniformly along the length thereof from a minimum diameter adjacent the intermediate portion 20 to a maximum diameter at the extreme end 30 of the second end portion 24. The variation in the depth of the slots 26 of the wall engaging jaws 28 corresponds with the variation in diameter of the tapered sleeve member 38 so that the external surface of the tapered sleeve member 38 remains in abutting relationship with the internal surfaces of the wall engaging jaws 28 when the tapered sleeve member 38 is axially positioned within the bore 18.

Figure 2:
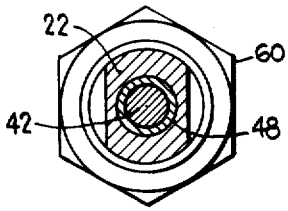
FIG. 2 is a sectional view of the bearing extractor taken along the line II–II of FIG. 1, illustrating the support sleeve mounted on the rod member within the extractor.

The rod member 42 has an enlarged end portion 44 and a threaded end portion 46 and is axially positioned within the cylindrical member axial bore 18. The rod threaded end portion 46 is arranged to threadably engage the internal threaded bore 40 of sleeve member 38. The rod enlarged end portion 44 is positioned externally of the cylindrical member axial bore 18 adjacent the end portion 22. A support sleeve generally designated by the numeral 48 having an axial bore 50 therethrough is mounted on and surrounds the rod member 42 adjacent the enlarged end portion 44. The support sleeve 48 includes a longitudinal cylindrical body portion 52 positioned within the annulus 54 provided between the rod member 42 and the cylindrical member 16 at the first end portion 22 thereof as illustrated in FIGS. 1 and 2. Formed integrally of the support sleeve body portion 52 is a flanged portion 56 that extends radially outwardly of the rod member 42. The inner surface of the flanged portion 56 abuts the shoulder 58 of the cylindrical member end portion 22 while the exterior surface of the flanged portion 56 abuts the enlarged end portion 44 of the rod member 42. With this arrangement the support sleeve 48 maintains axial alignment of the rod member 42 within the bore 18 of the cylindrical member 16 and prevents axial inward movement of rod 42 within the bore 18.

To extract the bearing assembly 12 from the recess 36 of the supporting structure 14, the cylindrical member second end portion 24 is inserted within the bearing bore 32 so that the plurality of wall engaging jaws 26 are positioned in abutting relationship with the bearing bore wall 34 to the full depth of the outermost bearing assembly 12 as shown in FIG. 1. Initially, the large diameter end portion of the tapered sleeve member 38 projects outwardly of the cylindrical member bore 18. A clamping device, such as a wrench, is engaged to the flats of the end portion 22 to maintain the cylindrical member 16 immovable relative to the bearing 12 as the rod member 42 is rotated in cylindrical member bore 18. Rotation of the rod member 42 in the bore 18 axially advances the tapered sleeve member 38 engaged with the rod member 42 into the bore 18. Movement of the sleeve member 38 within the bore 18 expands the cylindrical member expandable second end portion 24 radially outwardly so that the plurality of wall engaging jaws 28 move into frictional engagement with the bearing bore wall 34. Thus, the bearing assembly 12 can be removed from the supporting structure 14 once the wall engaging jaws 38 frictionally engage the bearing bore wall 34.

The removal of the bearing assembly 12 is controlled externally of the bearing bore 32 by a threaded fastening device, such as the hexagonal nut 60 illustrated in FIGS. 1 and 2. The nut 60 has a threaded bore 62 arranged to engage the cylindrical member intermediate portion 20. A brace member, such as the vertical plate 64, having a central opening 66 surrounds the intermediate portion 20 and is rigidly supported independently thereof. The central opening 66 has a diameter which is greater than the outer diameter of the intermediate portion 20 but less than the outer diameter of the nut 60. The brace member may include any rigid structure, such as a washer, steel bar, vise, wooden frame and the like, which is rigidly supported independently of the bearing extractor 10.

The nut 60 is threadedly advanced on the intermediate portion 20 until the bearing surface 68 thereof contacts the bearing surface 70 of the plate 64. Further tightening of the nut on the intermediate portion 20 against the plate 64 will urge the cylindrical member 16 with the bearing assembly 12 engaged by the jaws 28 axially away from the supporting structure 14 and thereby extract the bearing assembly 12 from the recess 36 of the supporting structure 14.

The procedure described above is then repeated for extraction of additional bearings coaxially mounted with the bearing previously removed. It will be apparent that the operation of this invention is not dependent upon the need for the rod member 42 to engage the seat or bottom of the bearing to provide a resistive force exerted against the rod member 42 as the bearing is extracted from the supporting structure. Furthermore, provision is made for successful extraction of a bearing from its supporting structure without mutilating the bearing bore wall or wedging the jaws 28 behind the bearing bore wal for removal of the bearing from the supporting structure.

Figure 4:
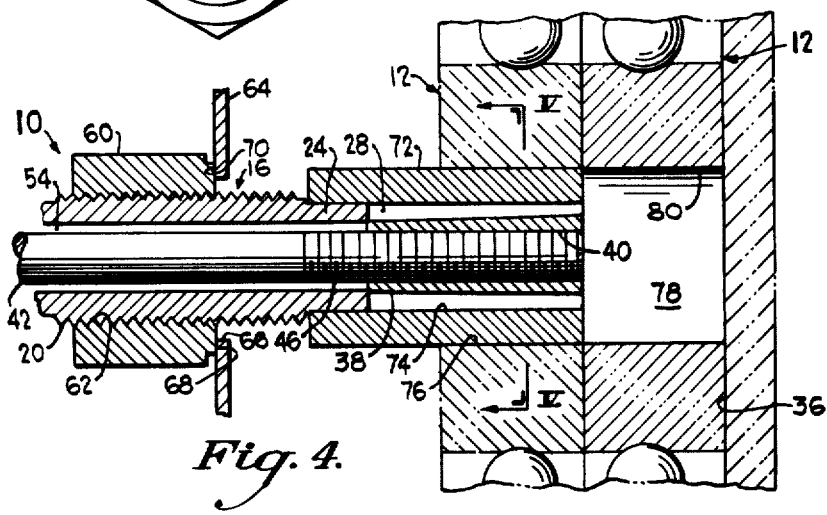
FIG. 4 is a longitudinal sectional view of the bearing extractor similar to FIG. 1 and illustrates the addition of an adaptor to the end portion of the extractor for use in removing a bearing having a diameter larger than that shown in FIG. 1.
Figure 5:
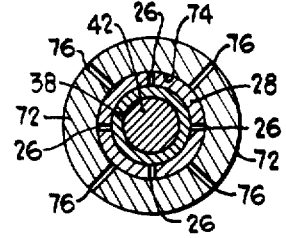
FIG. 5 is a sectional view taken along the line V-V of FIG. 4, illustrating the radial arrangement of the longitudinal slots provided in the adaptor mounted on the end portion of the extractor.

Further, in accordance with the present invention, there is provided a tubular member 72 for adapting the bearing extractor 10 to remove bearings having bores larger in diameter than that of the more commonly used bearings. As illustrated in FIGS. 4 and 5, the tubular member 72 is provided with a central bore 74 and includes a plurality of radially extending slots 76 arranged on the periphery of the tubular member 72 extending longitudinally therealong. The tubular member 72 is axially mounted on the expandable end portion 24 having the slotted portion arranged in overlying relation with the jaws 28 of the end portion 24. The expandable end portion 24 having the tubular member 72 mounted thereon is positioned within the bearing bore 78. Axial movement of the sleeve member 38 on the rod member 42 into the cylindrical member end portion 24 expands the jaws 28 in the manner described hereinabove urging the tubular member 72 to expand uniformly radially outwardly and frictiona-ly engage the bearing bore wall 80. Once the bearing extractor 10 has been securely positioned within the bearing bore 78 by the tubular member 72 to the jaws 28 the bearing assembly 12 is extracted from the recess 36 of the supporting structure 14 according to the above described procedure.

According to the provisions of the patent statutes, I have explained the principle, preferred construction and mode of operation of my invention and have illustrated and described what I now consider to represent its best embodiments. However, it should be understood that within the scope of the appended claims the invention may be practiced otherwise than as specifically illustrated and described.

I claim:

1. Apparatus for extracting a bearing from a supporting structure comprising,
   a cylindrical member having an axial bore therethrough and an externally threaded intermediate portion,
   said cylindrical member having first end portion and a radially expandable second end portion positioned within the bore of the bearing,
   a rod member having a threaded end portion axially positioned within said cylindrical member bore,
   a sleeve member coaxially positioned within said cylindrical member bore, said sleeve member having a bore threadedly engaged to said rod member threaded end portion,
   said sleeve member being positioned in abutting relation with said cylindrical member bore and arranged to advance axially therein upon rotation of said rod member to urge said cylindrical member second end portion into frictional engagement with the bearing,
   a fastening member threadedly engaged to said cylindrical member intermediate portion in spaced relation to said supporting structure and positioned for axial movement on said cylindrical member threaded intermediate portion, said fastening member having a bearing surface, and
   a brace member surrounding and rigidly supported independently of said cylindrical member threaded intermediate portion, said brace member having a bearing surface,
   said fastening member bearing surface being arranged to frictionally engage said brace member bearing surface.

2. Apparatus as set forth in claim 1 wherein said sleeve member includes,
a first end portion having a maximum diameter positioned coaxially within said cylindrical member at the extreme end of said expandable second end portion, and
a second end portion having a minimum diameter positioned coaxially within said cylindrical member adjacent said cylindrical member intermediate portion.

3. Apparatus as set forth in claim 1 in which said cylindrical member radially expandable second end portion includes,
a plurality of longitudinal slots equally spaced on the periphery of said second end portion,
said longitudinal slots extending radially outwardly from said cylindrical member bore.

4. Apparatus as set forth in claim 1 which includes,
a tubular member concentrically mounted on said cylindrical member expandable second end portion,
said tubular member having a plurality of radially extending slots arranged on the periphery of said tubular member and extending longitudinally therealong.
said tubular member being expandable to frictionally engage the bearing upon expansion of said cylindrical member expandable second end portion.

* * * * *